Jan. 18, 1927. 1,615,154
G. R. ANDERSON
ANTISKID DEVICE
Filed April 8, 1926
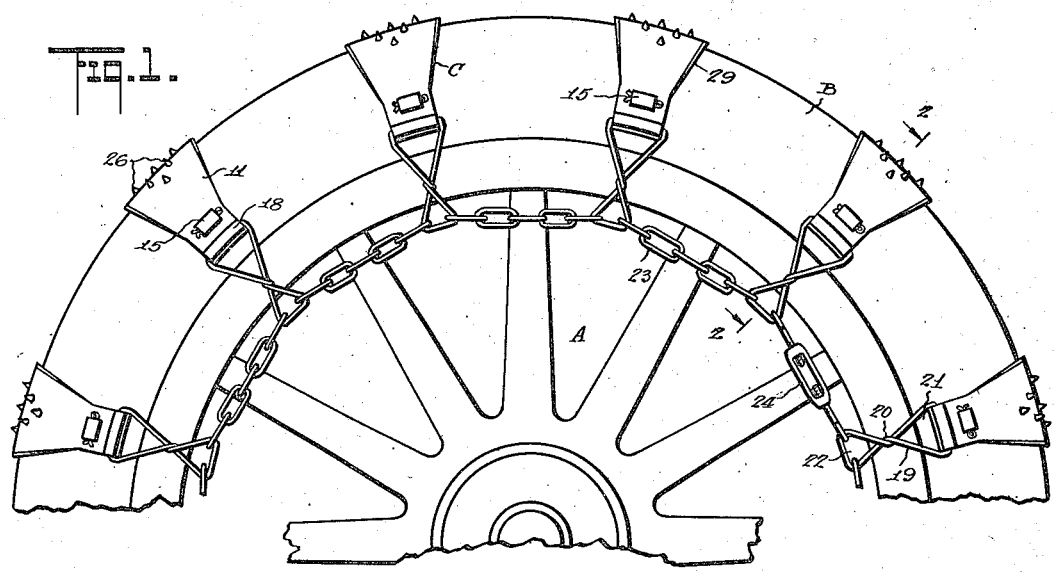
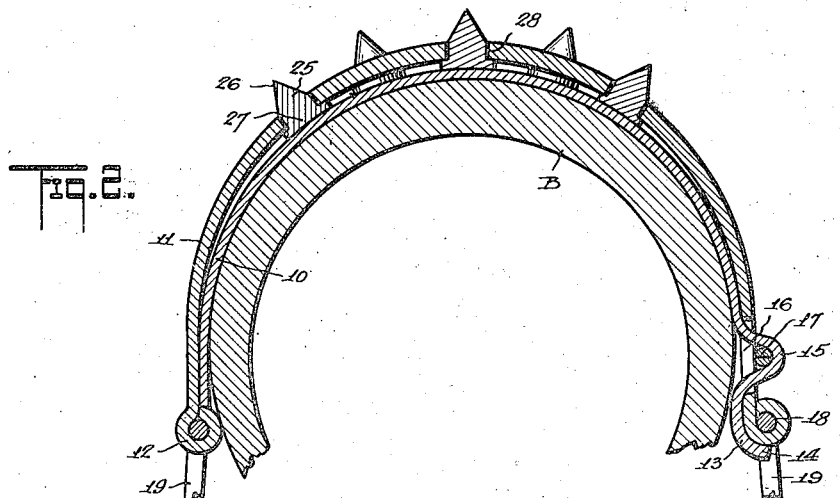
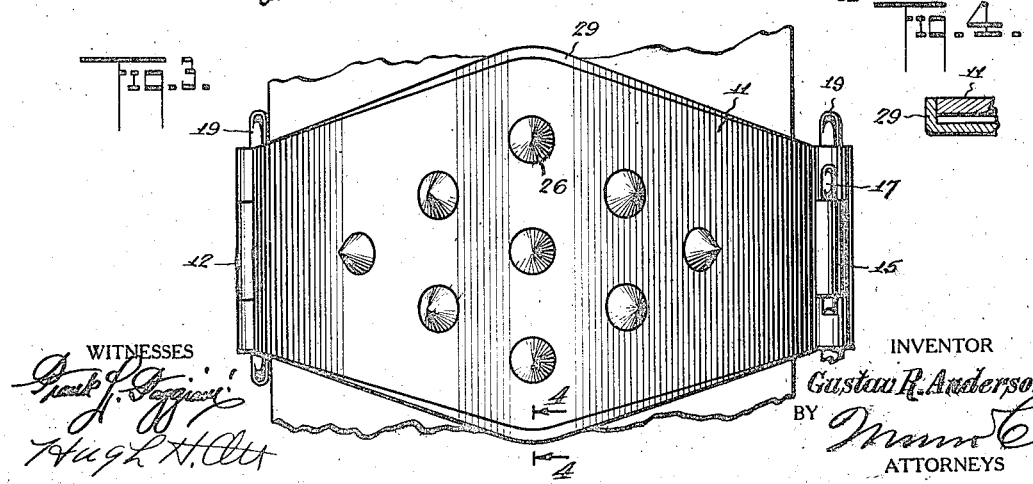

Patented Jan. 18, 1927.

1,615,154

UNITED STATES PATENT OFFICE.

GUSTAV R. ANDERSON, OF EAST ELMHURST, NEW YORK, N. Y.

ANTISKID DEVICE.

Application filed April 8, 1926. Serial No. 100,621.

This invention relates to anti-skid devices especially designed for application to pneumatic tires of automobiles for the purpose of preventing skidding and to afford increased traction on slippery pavements and in mud, sand or snow.

One of the principal objects of the present invention is to provide an anti-skid device or traction-increasing means which includes elements having pointed spurs for more effectually biting into the surface or roadbed, which spurs are capable of removal and replacement when worn to a degree which renders them unfit for further use, thereby effecting a substantial economy in view of the fact that the more expensive and principal parts of the device are subjected to little or no wear.

More specifically the invention comprehends an anti-skid device of the character set forth which consists of a plurality of circumferentially spaced tire-tread embracing elements having detachable and replaceable spurs and means for attaching and maintaining said elements in juxtaposition on the tire.

The invention furthermore comprehends a device of the character set forth which is comparatively simple in its construction, inexpensive to manufacture, and which is highly efficient in its purpose.

With the above recited and other objects in view, reference is had to the following specification and accompanying drawings in which there is exhibited one example or embodiment of the invention which is in no way intended as a limitation upon the scope of the appended claim as it is to be clearly understood that variations and modifications which properly fall within the scope of said claim may be resorted to when found expedient.

In the drawings—

Figure 1 is a fragmentary side view of an automobile wheel equipped with an anti-skid device constructed in accordance with the invention;

Fig. 2 is a transverse fragmentary sectional view on an enlarged scale, taken approximately on the line indicated at 2—2 in Fig. 1;

Fig. 3 is a fragmentary detail plan view of the device applied;

Fig. 4 is a fragmentary detail sectional view taken approximately on the line 4—4 of Fig. 3.

Referring to the drawings by characters of reference, A designates an automobile wheel provided with the usual pneumatic tire B.

The anti-skid device consists of a plurality of identically formed tire-tread embracing members C, each of which comprises a pair of inner and outer arcuate leaves 10 and 11, which are formed at one of their ends with alined hinged knuckles 12 for the reception of a hinging means, to permit of swinging of the same from a closed nested relation to an open relation. The shape or configuration of the leaves is such that the same snugly embraces the tread portion of the tire B when arranged therewith, and the free or unhinged end 13 of the inner leaf is formed with an outwardly curved terminal 14. Adjacent its free end the inner leaf is provided with an outwardly projecting U-shaped offset 15. The outer leaf adjacent its free or unhinged end is formed with a complementary receiving slot 16 for the offset 15, which is designed to project therethrough when the leaves are closed or nested for receiving a cotter pin 17 or other similar locking device. The free terminal of the outer leaf is bent into the form of a loop or eye 18, which receives a yoke or link member 19. The hinging means for the hinge knuckles 12 consists of a similar yoke or link member 19 and said hinging or yoke members 19 preferably consist of a length of wire or other material bent upon itself and twisted intermittently at 20 to define a pair of loops 21 and 22. One lead or a length of each loop 21 extends through the eye 18 or hinged knuckle 12, while the opposite loops 22 of the links or yokes of an adjacent pair of members C are joined by flexible connections, such as chain sections 23, which together with the loops 22 form a side chain as is usual in anti-skid tire chains. In order to admit of the application or removal of the device from the tire, each of said side chains is formed with a detachable means of connection 24.

In order to provide the tread embracing members with means for biting into the road bed or surface for preventing skidding and increasing traction, spur elements 25 are provided in the nature of shanks having pointed outer terminals 26 and enlarged heads 27 at the inner ends. The spurs are inserted through openings 28 in the outer leaf 11 of each tread embracing member, which openings are of a size snugly receiving the shanks of the spurs but of smaller diameter than the heads 27 which are clamped between the inner periphery of the outer periphery of the outer leaf and the outer periphery of the inner leaf.

When the pointed terminals 26 of the spurs are worn and are to be replaced, the cotter pins 17 are withdrawn, when the anti-skid device is removed from the tire permitting relative swinging movement of the sleeves to an open relation so that the spurs may be withdrawn from the openings 28 in the outer leaf and replaced by new ones, after which the leaves are swung to a closed relation and the cotter pins reinserted in the offsets 15. When applied to the tire, it is obvious that even in event of the loss of the cotter pin 17, the yokes or links 19 will maintain the leaves in a closed relation, the eyes 18 snugly fitting in the outwardly curved terminals 14 as particularly illustrated in Fig. 2.

What is claimed is:

An anti-skid device for tires, including a plurality of circumferentially spaced tire tread embracing elements, means for attaching and maintaining said elements on the tire, consisting of a pair of leaves having hinged connection at one end, the outermost leaf of each element having openings therein, spurs including shanks having pointed terminals at one end and heads at the opposite end, the shanks extending through the openings in the outer leaves and the heads positioned between the leaves, and detachable means for connecting the free ends of the leaves in overlapping nested relation, said means comprising a slotted portion adjacent the free end of one of the leaves, an offset looped portion adjacent the free end of the opposite leaf, and a retaining pin insertable through the part of the offset portion projecting through the slot.

GUSTAV R. ANDERSON.